United States Patent [19]

Nielsen

[11] 3,874,793
[45] Apr. 1, 1975

[54] ELECTRONIC PRINT EXPOSURE ANALYZER

[76] Inventor: Philip D. Nielsen, 9328 Chalk Hill Rd., Healdsburg, Calif. 95448

[22] Filed: Apr. 9, 1973

[21] Appl. No.: 349,352

[52] U.S. Cl. .................................. 355/68, 355/69
[51] Int. Cl. ........................................ G03b 27/74
[58] Field of Search .......... 355/68, 69, 77; 356/222, 356/226

[56] References Cited
UNITED STATES PATENTS

| | | | |
|---|---|---|---|
| 2,149,250 | 3/1939 | Bing | 355/68 X |
| 2,430,253 | 11/1947 | Simmon et al. | 355/68 |
| 3,506,352 | 4/1970 | Denner | 356/222 X |
| 3,639,058 | 2/1972 | Kimura | 3354/68 AX |
| 3,647,297 | 3/1972 | Westering | 355/68 |
| 3,708,676 | 1/1973 | Hubor et al. | 355/68 X |
| 3,741,088 | 6/1973 | Nobusawa | 356/222 X |

*Primary Examiner*—Samuel S. Matthews
*Assistant Examiner*—E. M. O'Connor
*Attorney, Agent, or Firm*—Townsend and Townsend

[57] ABSTRACT

An electronic print exposure analyzer for providing a direct indication of optimum paper grade and automatic control of exposure time in photographic printing. A pair of photosensitive probes provide a pair of signals representative of the intensity of the darkest and lightest portions of a projected image. A measuring circuit converts these signals to a setting of a variable resistance. The variable resistance controls the setting of a paper grade indicator, and also controls duration of an exposure time circuit.

8 Claims, 4 Drawing Figures

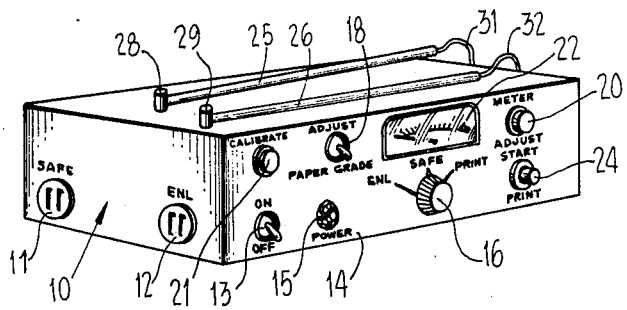
Fig_1
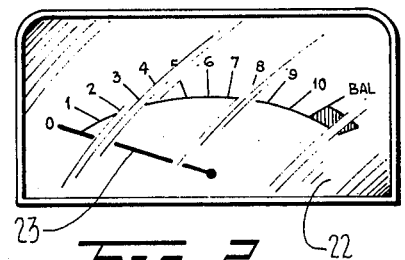
Fig_2
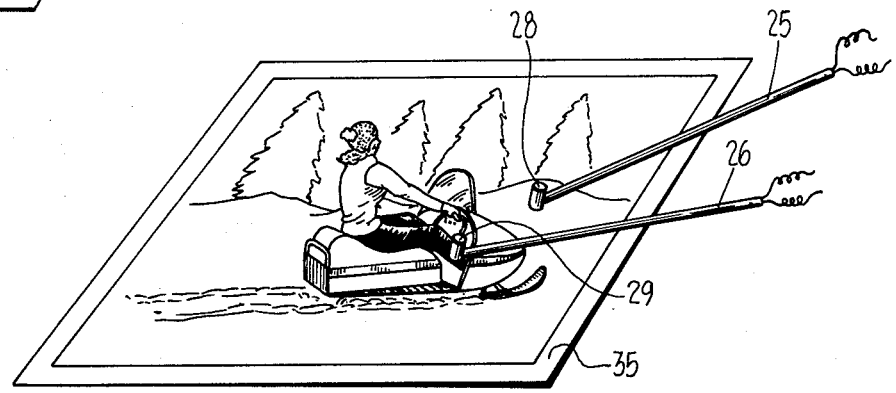
Fig_3
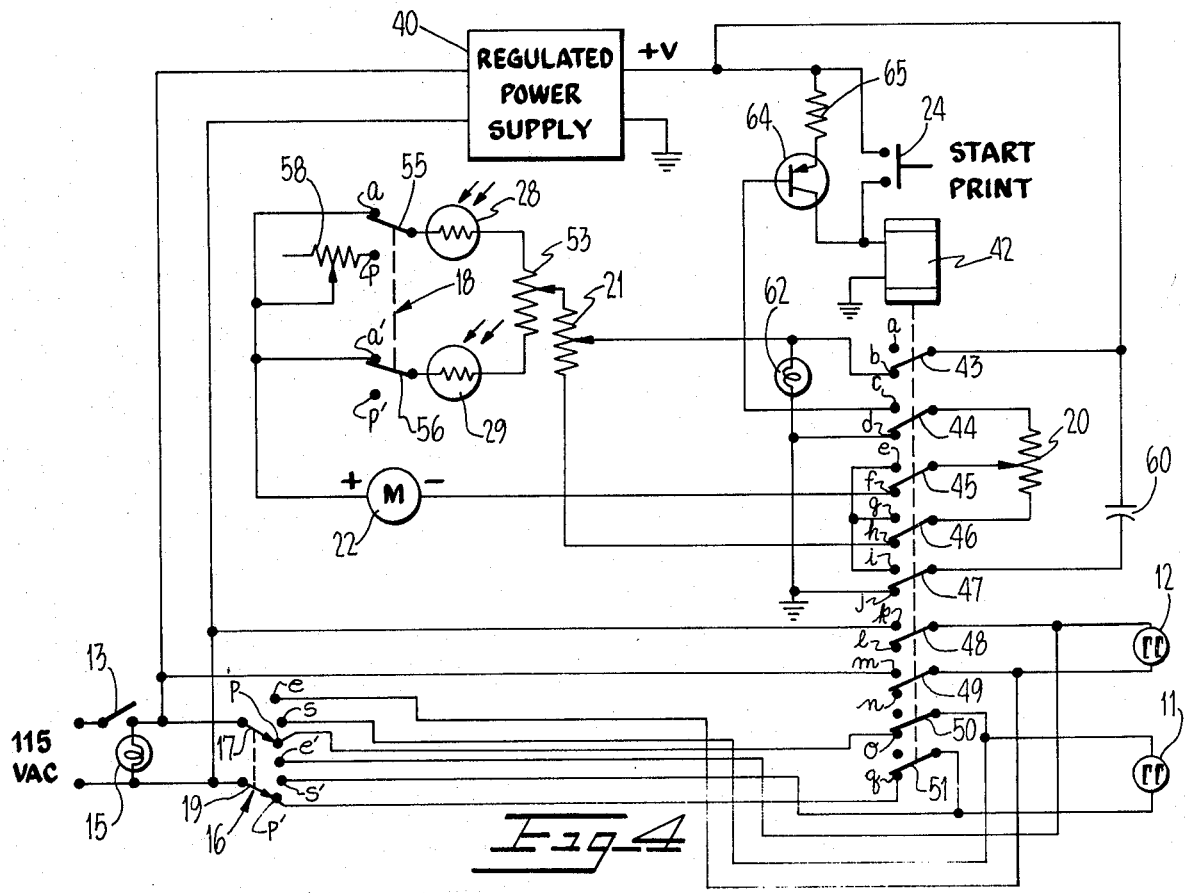
Fig_4

ELECTRONIC PRINT EXPOSURE ANALYZER

BACKGROUND OF THE INVENTION

1. Field of the Invention

This invention relates to photographic printing wherein a positive or a negative image of an original is produced by exposing photographic developer paper to the original image. More particularly, this invention relates to a system for determining proper paper grade and exposure time to optimize the photographic qualities of the finished print.

2. Description of the Prior Art

In the field of photographic development, it is known to produce a photograph of an original by exposing photosensitive developer paper to an image of the original. The resulting print may be either a positive or a negative reproduction of reduced, enlarged, or identical size of all or a portion of the original. In the case of a color original, the print may also be in color or in black and white tones only.

In order to produce a photographic print, a visible original image—usually a negative image—is first projected onto a work surface. Next, the projected image is aesthetically arranged by varying the image size, orientation and focus until the desired image composition is obtained, a process termed composing. After composing the image, image projection is interrupted and the photosensitive developer paper is positioned in the projection area. Next, the image is projected onto the photosensitive paper for a period of time sufficient to produce the desired reproduction image. Lastly the exposed paper is developed, fixed and mounted.

A typical photographic darkroom is equipped with an enlarger and a safe light. The enlarger is used to produce the projected image of the original and typically includes a projection lamp and various optical devices for providing variable image magnification and orientation in order to facilitate the process of image composing. The safe light emits light in the visible range for providing illumination of a darkroom; however, the light emitted by the safe light lies outside the spectral range of the photosensitive photographic paper. Thus, the safe light is used whenever it is necessary to handle unexposed photosensitive developer paper, e.g. after image composing but before final image projection.

In the course of print production, two important variables must be determined in advance in order to insure the production of prints having acceptable quality: viz., paper grade and exposure time. Several grades of photosensitive developer paper are available which exhibit varying degrees of tonal response, ranging from low contrast paper, e.g. that designated as number 1 paper, to high contrast paper, e.g. that designated as number 10 paper. Usually, the choice of paper grade varies inversely with the degree of tonal response exhibited by the original image. Thus, for an original image possessing a high contrast, a low numbered paper is ordinarily selected; while for an original image possessing low contrast, a high numbered paper is used.

In the past, the optimum paper grade has been determined on a trial and error basis for a given original image. This method of determining optimum paper grades suffers from the disadvantages of being inexact and time consuming. Due to the inexact nature of this method, prints of consistent quality are difficult to obtain. Further, the excessive time required to determine optimum paper grade results in inefficient use of the darkroom facilities, a factor which becomes increasingly disadvantageous as the number of operators sharing the darkroom facilities increases. In addition, the trial and error method of selecting optimum paper grade ordinarily requires several attempts, depending on the skill of the operator, before the optimum paper grade is established. Thus, in the course of paper grade selection in accordance with this method, several sheets of costly photosensitive paper are usually wasted.

Like paper grade selection, in the past determination of the correct exposure time has also been a trial and error process. This process also suffers from the disadvantages noted above for empirical paper grade selection. Efforts to eliminate these disadvantages have been directed to the development of devices for measuring the intensity of the projected original image and translating this value into an exposure time reading. Known devices employ a single photosensitive probe which is placed in the image area after image composing. The probe is provided with a working surface area sufficiently large to encompass the minimal portion of the image necessary to obtain an average value of the light intensity of the projected image. The output of the probe is coupled to a measuring circuit having a meter calibrated to provide a direct exposure time reading. This reading is interpreted by the operator and used as a guide in setting a timer coupled to the enlarger lamp.

The efficacy of such prior art exposure time measuring devices depends upon the image area on which the photosensitive probe is placed. If, for example, the probe is placed in a predominantly dark region of a negative image, the resulting exposure time reading will be too low. On the other hand, if the probe is placed in a predominantly light region, the resulting reading will be too high. In addition to the problem of placing the photosensitive probe in an image area which is truly representative of the average intensity of the projected image, the performance of such prior art devices is also affected by the very nature of the image itself. In an image having relatively, large sharply defined dark areas, e.g., it may be impossible to position the photosensitive probe in a portion of the image which will provide a truly representative value of the average light intensity.

SUMMARY OF THE INVENTION

The invention comprises an electronic print exposure analyzer which provides a direct indication of the optimum paper grade and automatic control of the exposure time during photographic printing in response to the adjustment of a single control, and which is inexpensive to fabricate, simple to operate, and highly accurate. In the preferred embodiment, a pair of photosensitive probes provide a pair of signals which are representative of the intensity of the darkest and lightest portions of a projected image. A measuring circuit converts these signals to a setting of a variable resistance. The variable resistance controls the setting of a paper grade indicator, e.g. a galvanometer, and also controls an exposure time circuit which automatically determines the length of the exposure time interval.

For a fuller understanding of the nature and advantages of the invention, reference should be had to the following detailed description taken in conjunction with the accompanying drawings.

BRIEF DESCRIPTION OF THE DRAWINGS

FIG. 1 is a perspective view of the preferred embodiment of the invention;

FIG. 2 is an enlarged view of the analyzer meter scale;

FIG. 3 is a schematic view illustrating placement of the photosensitive probes; and FIG. 4 is a circuit diagram of the preferred embodiment.

DESCRIPTION OF THE PREFERRED EMBODIMENT

Turning now to the drawings, FIG. 1 shows a preferred embodiment of the invention. A housing 10 is provided with a pair of female standard AC plug receptacles, 11, 12 labled SAFE and ENL respectively. Receptacles 11, 12 are adapted to receive the AC plugs associated with the safe and enlarger lights, (not shown) and are provided for the purpose of supplying power thereto under control of the circuitry described below. A power switch 13 is mounted on a front control panel 14, along with a power indicator lamp 15. Also mounted on front control panel 14 is a multiposition switch 16 having three positions viz., ENL, SAFE, and PRINT. Switch 16 controls the application of power to the SAFE and ENL sockets 11 and 12 in the manner described below. A two position switch 18 is provided to enable manual control of the preferred embodiment to either the ADJUST or PAPER GRADE measurement modes of operation. A variable resistance device 20 labeled METER ADJUST is provided for enabling operator adjustment of the setting of a panel meter 22 in the manner indicated below. A momentary contact switch 24 labeled START PRINT provides operator control of the initial portion of the print cycle. A second variable resistance device 21 labeled CALIBRATE is provided for facilitating calibration of the preferred embodiment.

A pair of probes 25, 26 having photosensitive elements 28, 29 are coupled via leads 31, 32 to circuitry housed internally of cabinet 10 and depicted in FIG. 4. To facilitate correct usage of the two probes 25, 26, they may be color coded or provided with other identifying indicia, serving to distinguish light probe 25 from dark probe 26. In the preferred embodiment, photosensitive elements 28, 29 are Clairex Corp. type CL5 M5L photocells.

With reference to FIG. 2, panel meter 22, which may be any suitable type of electrical variable scale device, e.g. a galvanometer or an ordinary VU meter, is provided with a scale graduated in paper numbers 0–10 and a balance mark. The purpose of this scale will be made clear from a consideration of the ensuing description of the operation of the invention.

With reference to FIG. 3, in operation power switch 13 is moved to the ON position, and switch 16 is rotated to the ENL position, thereby supplying AC power to the enlarger lamp via receptacle 12. With the enlarger lamp energized, the original image is projected onto a work surface 35 and composed by the operator. Next, light probe 25 is inserted into the image field with the light sensitive surface of photosensitive element 28 located in the lightest image area and facing the enlarger lamp (not shown). The dark probe 26 is inserted into the image area with the light sensitive face of photosensitive element 29 in the darkest portion of the image and also facing the enlarger lamp. With probes 25, 26 arranged in this manner, switch 18 is set to the ADJUST position and variable resistance 20 is rotated until pointer 23 of panel meter 22 is positioned on the balance line, thereby indicating that the exposure print analyzer is correctly adjusted.

Switch 18 is next placed in the PAPER GRADE position. In this position pointer 23 of meter 22 automatically moves to a position on the paper grade number scale specifying the proper paper grade for the projected image. Probes 25, 26 are now removed from the image field and switch 16 is rotated to the SAFE position, thereby energizing the safe light via socket 11, and deenergizing the enlarger light by removing power from socket 12. With the safe light now energized, photosensitive paper of the indicated grade may be selected and placed in the image field on work surface 35.

With the photosensitive developer paper now in position, switch 16 is rotated to the PRINT position and START PRINT switch 24 is actuated by the operator. Actuation of the START PRINT switch 24 enables the exposure analyzer circuitry to provide power to the enlarger lamp via receptacle 12 for a predetermined period of time controlled by the setting of variable resistance 20. After the predetermined exposure interval has elapsed, power is automatically removed from enlarger lamp receptacle 12 and the exposure cycle is complete. If one or more additional prints are desired, it is only necessary to remove the exposed photosensitive paper, place a fresh sheet of photosensitive developer paper on the work surface 35, utilizing the safe light if desired, and actuate the START PRINT switch 24 again. For each actuation of the START PRINT switch 24, the enlarger lamp is automatically energized for the same predetermined period and automatically extinguished by the automatic circuitry.

FIG. 4 shows the actual circuitry employed in the preferred embodiment of the invention. A regulated power supply 40 coupled to an AC voltage source provides a regulated DC voltage source to the paper grade-exposure time interval measuring circuit and the exposure time control circuit. In the preferred embodiment, power supply 40 comprises a regulated 36 volts DC-300 milliamp source.

AC source voltage is also coupled to lamp plug receptacles 11, 12 via switch 16, to safe lamp plug receptacle 11 via a pair of contacts o, q and blades 50, 51 of a relay 42 and also to plug receptacle 12 via a pair of contacts m, n, and blades 48, 49 of relay 42. Relay 42 is preferable a Cornell Dubilier type A1 04DO' 24V relay.

In the measuring mode of operation, the output of regulated power supply 40 is coupled via relay blade 43 and contact b to the adjustable arm of a first variable resistance 21. One end of variable resistance 21 is coupled to the adjusting arm of a second variable resistance 53. The other end of variable resistance 21 is coupled via relay contact h and blade 46 to one end of variable resistance 20, the other end of which is coupled via relay blade 44 and contact d to ground potential.

One end of variable resistance 53 is coupled via light photosensitive devide 28, first blade 55 of switch 18 and contact a to one side of meter 22. The other end of variable resistance 53 is coupled via dark photosensitive device 29, second blade 56 of gang switch 18 and contact a' to the same input of meter 22. The output of meter 22 is coupled via relay contact f and blade 45 to the adjustable arm of variable resistance 20.

When switch 18 is placed in the PAPER GRADE position, photosensitive device 28 is coupled via switch blade 55 of switch 18 and contact p to one side of a variable resistance 58. The adjustable arm of variable resistance 58 is coupled to meter 22. In addition, photosensitive device 29 is removed from the circuit when switch 18 is in this position.

The output of power supply 40 is also coupled to one plate of a storage capacitor 60, the other plate of which is coupled via relay blade 47 and contact j to ground.

A panel lamp 62 is coupled between relay contact b and ground in order to illuminate meter 22 whenever the system is in the measuring mode.

The exposure time interval control circuit comprises relay 42, START PRINT switch 24, variable resistance 20, storage capacitor 60 and switching transistor 64, which in the preferred embodiment is an RCA type PNP SK 3085 transistor, provided with load resistor 65.

The operation of the circuit proceeds as follows. With main power switch 13 closed, power supply 40 furnishes voltage via relay blade 43 and contact b to the measuring circuit. Storage capacitor 60 is also charged by the output of power supply 40. Switch 16 is placed in the ENL position in which AC voltage is applied via blades 17, 19 and contacts e, e' of switch 16 to enlarger lamp plug receptacle 12. With switch 18 in the ADJUST position (i.e. with blades 55, 56 in electrical contact with contacts a, a') photosensitive elements 28, 29 are inserted into the image area as shown in FIG. 3 and arranged in the manner noted above. When properly arranged, the signals applied via photosensitive elements 28, 29 to the input of meter 22 are representative of the differential light intensity or tonal range of the projected image. Variable resistance 20 is then adjusted by the operator to provide the visual balance indication. With switch 18 thrown to the PAPER GRADE position, photosensitive element 28 is coupled through variable resistance 58 to meter 22, which then furnishes the proper paper grade indication on the panel meter.

To initiate a print cycle, switch 16 is moved to the print position in which blades 17, 19 are coupled to contacts p, p'. In this position, AC voltage is supplied to SAFE lamp receptacle via contacts o, q and blades 50, 51 of relay 42 so long as relay 42 is in the unactuated state. Further, AC voltage can only be supplied to enlarger lamp receptacle 12 via the contacts of relay 42 as specified below. When START PRINT switch 24 is momentarily closed, supply voltage is applied to one side of the relay 42 coil, the other end of which is grounded as indicated, and relay 42 is actuated thereby moving blades 43–51 to the alternate positions. This places the analyzer in the exposure time control mode.

When relay 42 is actuated, AC voltage is removed from relay contacts o, q to extinguish the SAFE lamp and is also applied from the source via contacts k, m and blades 48, 49 to enlarger lamp plug receptacle 12. The formerly grounded plate of capacitor 60 is coupled via relay blade 47, contact i, contact e, and blade 45 to the adjustable arm of variable resistance 20. In this manner, the potential on this plate of capacitor 60 is applied through variable resistance 20 to the base of switching transistor 64, thereby switching transistor 64 on. With transistor 64 switched on, relay 42 remains actuated until the potential on the coupled plate of capacitor 60 falls below the minimum threshold required to maintain transistor 64 actuated. The length of time required for the potential on capacitor 60 to fall below this threshold is dependent upon the setting of variable resistance 20. When this potential has fallen below this threshold, switching transistor is switched off, thereby deactuating relay 42. When relay 42 is deactuated, blades 43–51 return to the configuration depicted in FIG. 4 thereby removing AC power from enlarger lamp plug receptacle 12 and extinguishing the enlarger lamp and applying AC power to safe lamp plug receptacle 11 thereby energizing the safe lamp. In addition, since the lower plate of storage capacitor 60 is reconnected via blade 47 and contact j to ground, capacitor 60 recharges. The sustem is now ready for the initiation of another print cycle, which proceeds as described above.

Circuit elements 53 and 58 are shown as variable resistances to facilitate calibration of meter 22. If desired, once the system has been calibrated, these elements may be replaced by fixed resistance networks providing the appropriate values.

As will now be apparent, the above disclosed invention provides a highly effective electronic print exposure analyzer enabling the production of photographic prints of consistent high quality. Particularly effective and advantageous is the use of a single adjustable control, viz. variable resistance 20, to provide both the paper grade measurement and also the duration of the exposure time interval. In addition, electronic print exposure analyzers constructed in accordance with the invention enable the operator to energize the safe light during exposure by the manual override provided by multiposition switch 16 without disturbing the print exposure process.

While the foregoing provides a full disclosure of the preferred embodiment of the invention, it is understood that various modifications, alternate constructions and equivalents may be employed without departing from the true spirit and scope of the invention. Therefore, the above description and illustrations should not be construed as limiting the scope of the invention, which is solely defined by the appended claims.

What is claimed is:

1. An electronic print exposure analyzer for providing a paper grade index and for automatically controlling the duration of an exposure time interval during the reproduction of a projected image, said analyzer comprising:

means for providing a pair of contemporary control signals representative of the contrast range of said projected image, said means comprising first and second photosensitive elements, said first photosensitive element adapted to be arranged in the brightest portion of said projected image and said second photosensitive element adapted to be arranged in the darkest portion of said projected image, a measuring circuit coupled to said signal providing means for generating a signal representative of said paper grade index, said measuring circuit including a visible indicator and switch means for coupling said photosensitive devices in parallel to said visible indicator when in a balance adjust position and for coupling one of said photosensitive devices to said visible indicator when in a paper grade index position; input terminal means adapted to be coupled to a source of enabling voltage; a first pair of enabling voltage output terminals adapted to be coupled to an image exposure lamp and exposure time control circuit for controlling the coupling of said enabling voltage input terminal means to said first pair of enabling voltage output terminals an adjustable resistance device for enabling manual adjustment of said measuring circuit to a balance condition indicated by said visible indicator, the setting of said adjustable resistance device after said balance condition is attained providing a control parameter for establishing the duration of the exposure time interval; and coupling means for alternately coupling said adjustable resistance device to said measuring circuit and said exposure time control circuit.

2. The apparatus of claim 1 wherein said visible indicator includes a paper grade scale and a balance position, said balance position serving to indicate the proper adjustment of said adjustable resistance device when coupled to said measuring circuit.

3. The apparatus of claim 1 wherein said exposure time control circuit includes a switching device having an input coupled to said enabling voltage input terminal means, an output coupled to said first pair of enabling voltage output terminal means and a control member for coupling said switching decive input to said output in response to a control signal; means for generating said control signal; and means for disabling said generating means after said exposure time interval.

4. The apparatus of claim 3 wherein said disabling means includes a charge storage device and said coupling means includes means for coupling said adjustable resistance device to said charge storage device for the duration of said exposure time interval.

5. The apparatus of claim 1 further including a second pair of enabling voltage output terminals adapted to be coupled to additional associated equipment, and a multiple position switch having a pair of input terminals coupled to said enabling voltage input terminal means and having a plurality of contact members for alternately coupling said input terminals to said first and second pair of output terminals so that said exposure time control circuit can be by-passed.

6. An electronic print exposure analyzer for providing an index of optimum photosensitive paper grade matched to a projected image and for automatically controlling the exposure time interval during photographic printing of said projected image, said analyzer comprising:

a measuring circuit for measuring the tonal contrast of said projected image, said measuring circuit including first and second photosensitive devices adapted to be arranged in the brightest and darkest portions, respectively, of said projected image for providing a pair of contemporary control signals representative of said tonal contrast, an adjustable resistance device for enabling adjustment of said circuit to a balanced condition, a visual indicator having a graduated paper grade scale and a balance position, means for coupling said indicator means to said photsensitive devices, said coupling means including a switch means for coupling both said first and second photosensitive devices to said visual indicator when in a balance position to permit adjustment of said measuring circuit to said balanced condition and for coupling one only of said photosensitive devices to said visual indicator when in a paper grade index position to permit said visual indicator to achieve a reading of said optium paper grade;

an exposure time interval circuit for limiting the duration of said exposure time interval, said circuit including at least one input terminal coupled to a power source, at least one output terminal adapted to be coupled to an enlarger lamp, means having an actuated and a non-actuated state for coupling said input to said output, and control means for controlling the duration of said actuated state of said coupling means; and switching means for electrically disconnecting said adjustable resistance device from said measuring circuit and for electrically connecting said adjustable resistance device to said exposure time interval circuit, the state of adjustment of said adjustable resistance device required for said balanced condition providing a value to said control means for determining the length of said exposure time interval.

7. The apparatus of claim 6 wherein said control means includes a charge storage device, means for charging said charge storage device to a predetermined reference potential when said coupling means is in the actuated state, a holding circuit for maintaining said coupling means in said actuated state wherein said input is coupled to said output, and means for coupling said charge storage device to said holding circuit.

8. The apparatus of claim 6 further including at least one additional output terminal adapted to be coupled to a safe lamp, and additional switching means having at least one input terminal coupled to said power source and selectively actuatable means for electrically coupling said power input terminal alternately to said safe lamp output terminal and said enlarger lamp output terminal, said additional switching means providing independent coupling of said power input terminal to said safe lamp and said enlarger lamp.

* * * * *